United States Patent
Pajel et al.

(10) Patent No.: US 9,188,226 B2
(45) Date of Patent: Nov. 17, 2015

(54) APPARATUS FOR INSTALLING A SEAL CAP

(71) Applicant: The Boeing Company, Chicago, IL (US)

(72) Inventors: Carissa Ann Pajel, Mill Creek, WA (US); Robert Marshall Burgess, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/941,915

(22) Filed: Jul. 15, 2013

(65) Prior Publication Data

US 2015/0014933 A1 Jan. 15, 2015

(51) Int. Cl.
*F16B 37/14* (2006.01)
*F16J 15/02* (2006.01)
*F16B 33/00* (2006.01)

(52) U.S. Cl.
CPC .............. *F16J 15/02* (2013.01); *F16B 37/14* (2013.01); *F16B 33/004* (2013.01)

(58) Field of Classification Search
CPC .......... F16B 5/02; F16B 37/14; F16B 33/004; F15J 15/14; F16J 15/02
USPC ............ 411/372.5, 375, 429, 82, 82.3, 372.6, 411/373; 156/60, 91, 92, 538
See application file for complete search history.

(56) References Cited

U.S. PATENT DOCUMENTS

| | | | | |
|---|---|---|---|---|
| 3,557,654 A | * | 1/1971 | Weidner, Jr. | 411/396 |
| 3,618,444 A | * | 11/1971 | Kay | 411/373 |
| 4,092,896 A | * | 6/1978 | Puchy | 411/542 |
| 4,373,842 A | * | 2/1983 | Bettini et al. | 411/377 |
| 4,519,974 A | | 5/1985 | Bravenec et al. | |
| 4,826,380 A | * | 5/1989 | Henry | 411/377 |
| 4,971,745 A | * | 11/1990 | Ferenc et al. | 264/263 |
| 6,158,933 A | | 12/2000 | Nicholson | |
| 6,398,312 B1 | | 6/2002 | Marczynski et al. | |
| 8,717,736 B2 | * | 5/2014 | Asahara et al. | 361/218 |
| 2011/0226896 A1 | * | 9/2011 | Bessho et al. | 244/1 A |
| 2013/0186552 A1 | * | 7/2013 | Asahara et al. | 156/92 |
| 2013/0223951 A1 | * | 8/2013 | Bessho et al. | 411/337 |

(Continued)

FOREIGN PATENT DOCUMENTS

| | | | | |
|---|---|---|---|---|
| DE | 2022907 A1 | * | 11/1970 | F16B 33/00 |
| DE | 7121067 U | * | 9/1971 | |
| DE | 27 17 816 A1 | * | 11/1977 | F16B 37/14 |

(Continued)

OTHER PUBLICATIONS

Wiseman, "Tool for Removing Sealant Around a Seal Cap," U.S. Appl. No. 13/886,557, filed May 3, 2013, 44 pages.

(Continued)

*Primary Examiner* — Gary Estremsky
(74) *Attorney, Agent, or Firm* — Yee & Associates, P.C.

(57) ABSTRACT

A method and apparatus for installing a seal cap. The seal cap may be adhered to a fastener element using a material. A portion of the material may be squeezed out as excess material in response to adhering the seal cap to the fastener element. A number of projections associated with the seal cap may be moved along an interface formed between the seal cap and an object in which the fastener element has been installed. The excess material may be faired using the number of projections as the number of projections is moved along the interface between the seal cap and the object.

12 Claims, 10 Drawing Sheets

(56) References Cited

U.S. PATENT DOCUMENTS

2014/0048198 A1* 2/2014 Dobbin et al. ............. 156/91
2014/0261956 A1* 9/2014 Wiseman et al. ........... 156/60

FOREIGN PATENT DOCUMENTS

| DE | 44 39 567 A1 | * | 6/1995 | ............ F16B 37/14 |
| GB | 2 163 817 A | * | 3/1986 | ............ F16J 15/14 |
| GB | 2481299 A | * | 12/2011 | |
| JP | 2012232692 A | | 11/2012 | |
| WO | WO 2010/113523 A1 | * | 7/2010 | ............ F16B 5/02 |
| WO | WO 2012/107741 A1 | * | 8/2012 | ............ B64D 45/02 |
| WO | WO 2012/147645 A1 | * | 11/2012 | |

OTHER PUBLICATIONS

"PRC Seal Caps Application Guide," Customized Sealant Solutions, PPG Aerospace, PRC-DeSoto International, Inc., May 2011, 2 pages, accessed Apr. 29, 2013. http://www.ppg.com/coatings/aerospace/sealants/sealantsproducts/Documents/SealCapApplicationGuide.pdf.

"PRC Seal Caps," Customized Sealant Solutions, PPG Aerospace, PRC-DeSoto International, Inc., Feb. 2011, 2 pages, accessed Apr. 29, 2013. http://www.ppg.com/coatings/aerospace/sealants/sealantsproducts/Documents/SealCapFlyer.pdf.

Extended European Search Report, dated Jan. 22, 2015, regarding Application No. EP14172003.7, 8 pages.

* cited by examiner

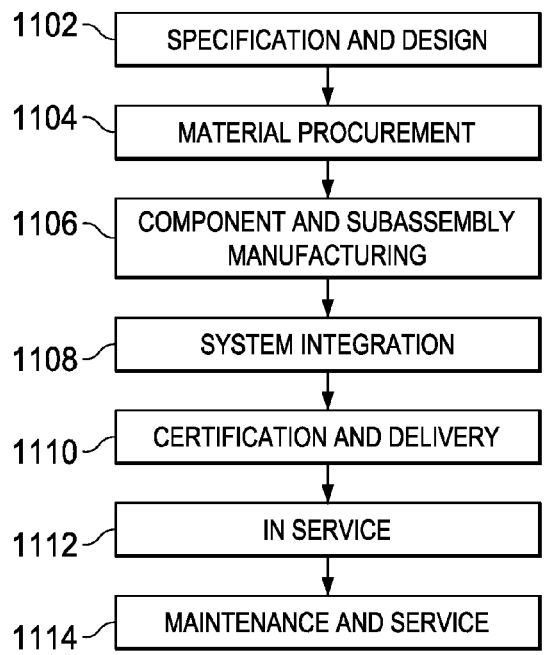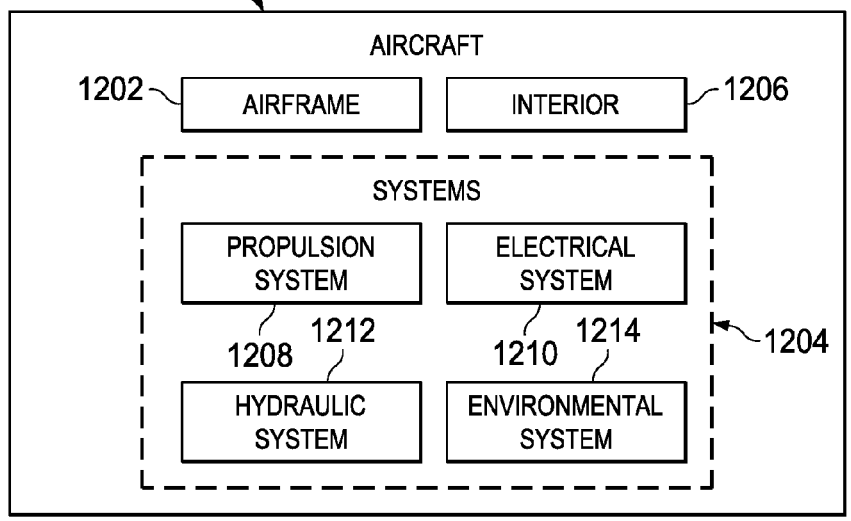

APPARATUS FOR INSTALLING A SEAL CAP

BACKGROUND INFORMATION

1. Field

The present disclosure relates generally to seal caps and, in particular, to the installation of seal caps. Still more particularly, the present disclosure relates to a method and apparatus for fairing sealant that squeezes out of a seal cap during installation of the seal cap.

2. Background

Seal caps may be used to cover and seal fastener elements such as, for example, without limitation, screws and bolts. Typically, a seal cap may be installed over a fastener element by applying a sealant material within a cap and then placing the cap over the head of the fastener element. In some cases, the cap may be referred to as the seal cap. In other cases, the cap and the sealant material may together form a seal cap.

During installation, the cap and the sealant material may be pressed down over the fastener element to ensure that the sealant material adheres to and fully covers the fastener element. However, oftentimes, excess sealant material may squeeze out around the cap when the cap and the sealant material within the cap are placed over the fastener element and pressed downwards. The excess sealant material around the cap may be undesirable. For example, without limitation, seal caps may be used for an object in which multiple fastener elements have been installed.

Excess sealant material may reduce the aesthetic appeal of the object into which the fastener element has been installed. Further, the excess sealant material may increase the weight of the object more than desired. In some cases, excess sealant material may separate and become foreign object debris. For example, without limitation, when used inside a fuel tank, the flow of the fuel within the fuel tank may cause some of the excess sealant material to break apart and form undesired debris within the fuel tank.

Consequently, fairing the excess sealant material such that the excess sealant material has a desired shape and/or thickness around the seal cap may be desirable. As used herein, "fairing" may mean smoothing out, rounding out, and/or rubbing.

With some currently available methods for installing seal caps, excess sealant material that squeezes out of a seal cap may be faired by hand. However, this process may be more time-consuming than desired. When an object comprises multiple fastener elements over which seal caps are to be installed, the time needed to smooth out this excess sealant material may increase production times and/or costs for the object more than desired. Therefore, it would be desirable to have a method and apparatus that take into account at least some of the issues discussed above, as well as other possible issues.

SUMMARY

In one illustrative embodiment, an apparatus may comprise a seal cap and a number of projections associated with the seal cap. The seal cap may be configured to be adhered to and sealed to a fastener element. The number of projections may be configured to fair excess material around the seal cap when the number of projections is moved along an interface formed between the seal cap and an object in which the fastener element has been installed.

In another illustrative embodiment, a seal cap may comprise a hollow portion, an inner surface, an outer surface, and a number of projections. The hollow portion may be configured to receive a fastener element. The inner surface may be configured to be adhered to and sealed to the fastener element using a sealant material in which excess sealant material squeezes out and around the seal cap. The number of projections may be associated with the outer surface of the seal cap. The number of projections may be configured to fair the excess material when the number of projections is moved along an interface formed between the seal cap and an object in which the fastener element has been installed.

In yet another illustrative embodiment, a method for installing a seal cap may be provided. The seal cap may be adhered to a fastener element using a material. A portion of the material may be squeezed out as excess material in response to adhering the seal cap to the fastener element. A number of projections associated with the seal cap may be moved along an interface formed between the seal cap and an object in which the fastener element has been installed. The excess material may be faired using the number of projections as the number of projections is moved along the interface between the seal cap and the object.

In still yet another illustrative embodiment, a method for sealing a fastener element may be provided. A seal cap may be adhered to the fastener element using a sealant material. A portion of the material may be squeezed out as excess material in response to adhering the seal cap to the fastener element. The seal cap may be rotated such that a number of projections associated with the seal cap rotate along an interface between the seal cap and an object in which the fastener element has been installed. The excess sealant material around the seal cap may be faired to a desired thickness using the number of projections as the number of projections is rotated along the interface between the seal cap and the object.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of an aircraft manufacturing and service method in the form of a block diagram in accordance with an illustrative embodiment; and FIG. 12 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a method and apparatus for installing a seal cap over a fastener element that reduces the overall time needed to install the seal cap. The illustrative embodiments also recognize and take into account that it may be desirable to have a tool that may be configured to smooth out excess sealant material that squeezes out of a seal cap during installation such that the remaining portion of sealant material around the seal cap is of a specified amount and/or a specified thickness.

Thus, the illustrative embodiments may provide a method and apparatus for sealing a fastener element using a seal cap. In one illustrative embodiment, the seal cap may comprise a hollow portion, an inner surface, an outer surface, and a number of projections. The hollow portion may be configured to receive a fastener element. The inner surface may be configured to be adhered to and sealed to the fastener element using a sealant material in which excess sealant material squeezes out and around the seal cap. The number of projections may be associated with the outer surface of the seal cap. The number of projections may be configured to fair the excess sealant material when the number of projections is moved along an interface formed between the seal cap and an object in which the fastener element has been installed.

Figure 1:
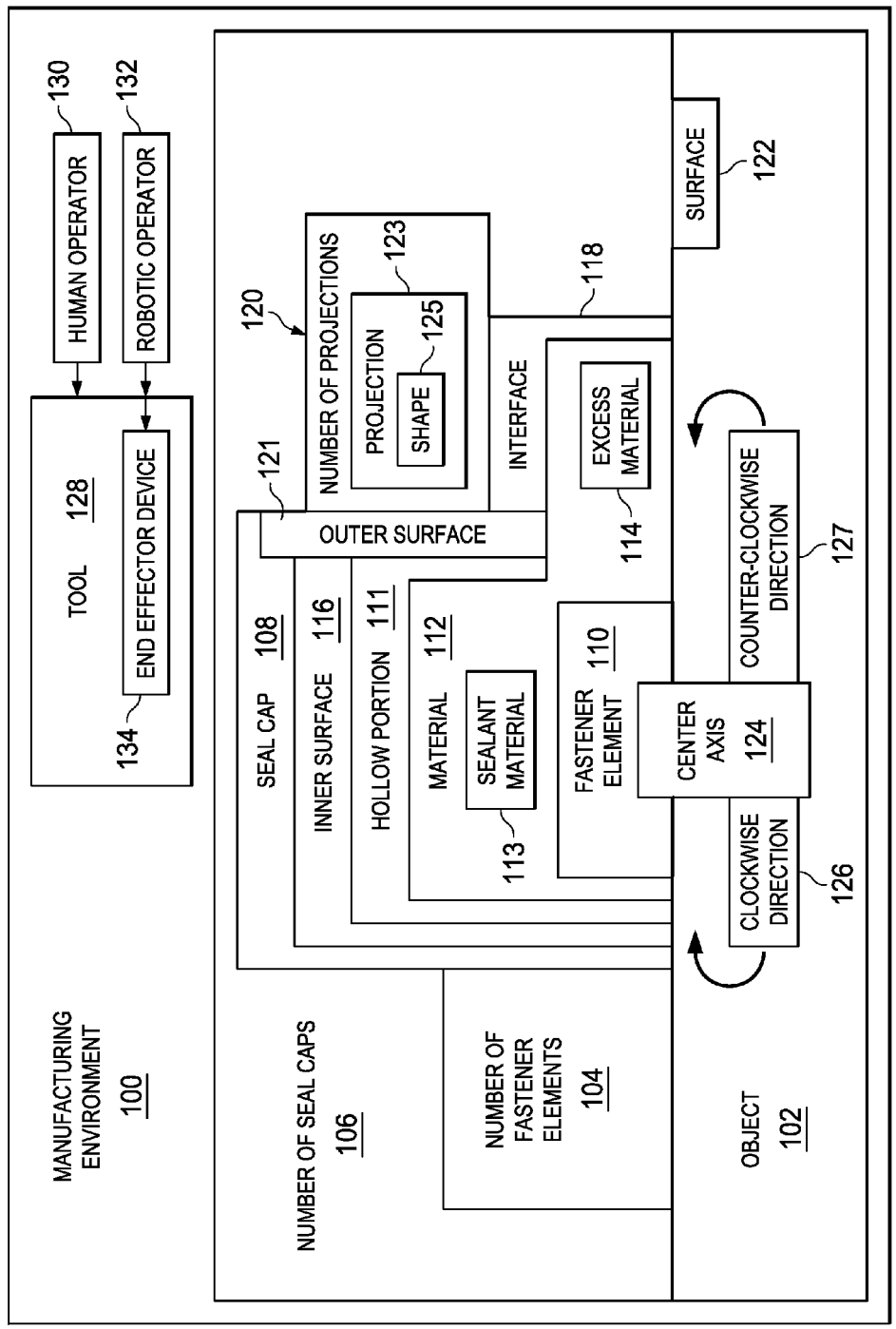
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. Manufacturing environment 100 is an example of one environment in which object 102 may be formed. Object 102 may take a number of different forms. Object 102 may take the form of, for example, without limitation, a wing box, a spar assembly, a structural frame, or some other type of object.

Object 102 may be formed using number of fastener elements 104. As used herein, a "number of" items may include one or more items. In this manner, number of fastener elements 104 may include one or more fastener elements. Number of fastener elements 104 may be installed along any portion of object 102. Number of fastener elements 104 may include at least one of a screw, a bolt, a pin, a tie, a clamp, or some other type of fastener element.

As used herein, the phrase "at least one of," when used with a list of items, may mean different combinations of one or more of the listed items may be used and only one of the items in the list may be needed. The item may be a particular object, thing, or category. In other words, "at least one of" may mean any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Number of seal caps 106 may be used to cover and seal number of fastener elements 104. In particular, a seal cap in number of seal caps 106 may be used to cover and seal a corresponding fastener element in number of fastener elements 104. As one illustrative example, seal cap 108 in number of seal caps 106 may be used to cover and seal fastener element 110 in number of fastener elements 104.

Seal cap 108 may be used to reduce the possibility of any fluid, such as a liquid, air, or some other type of fluid, passing through the interface between fastener element 110 and object 102. Further, seal cap 108 may reduce the possibility of any undesirable material, such as, for example, without limitation, dirt particles and/or other substances, from passing through the interface between fastener element 110 and object 102. Additionally, seal cap 108 may also be used to reduce and/or prevent undesired effects resulting from electromagnetic events such as, for example, without limitation, plasma ejections during lightning strikes and/or other types of electromagnetic events.

In one illustrative example, seal cap 108 may be installed over fastener element 110 by applying material 112 over fastener element 110 and then placing seal cap 108 over material 112. In another illustrative example, seal cap 108 may be installed over fastener element 110 by injecting material 112 into hollow portion 111 of seal cap 108 and then placing seal cap 108 with material 112 inside hollow portion 111 over fastener element 110. Hollow portion 111 of seal cap 108 may be formed by inner surface 116 of seal cap 108.

In this illustrative example, material 112 may take the form of sealant material 113. However, in some cases, material 112 may be an adhesive material or some other type of material.

Seal cap 108 may be pressed down towards fastener element 110 such that inner surface 116 of seal cap 108 adheres to material 112 and, consequently, adheres to and seals fastener element 110 underneath material 112. During this process, excess material 114 may squeeze out around seal cap 108. In particular, excess material 114 may squeeze out along interface 118 between seal cap 108 and object 102.

In one illustrative example, seal cap 108 may be considered properly sealed to fastener element 110 and object 102 when excess material 114 squeezes out around the entire perimeter of interface 118 between seal cap 108 and object 102. In other words, seal cap 108 may be considered properly sealed to fastener element 110 when excess material 114 surrounds all 360 degrees around interface 118.

In some cases, seal cap 108 may be considered properly sealed to fastener element 110 and object 102 when excess material 114 has a desired thickness and/or extends a desired distance from seal cap 108 along interface 118 between seal cap 108 and object 102. In particular, excess material 114 may need to have a desired thickness and/or extend a desired distance from outer surface 121 of seal cap 108 and/or surface 122 of object 102 along interface 118. As depicted, number of projections 120 may be associated with seal cap 108.

As used herein, when one component is "associated" with another component, this association may be a physical association in the depicted examples. For example, without limitation, a first component, such as one of number of projections 120, may be considered to be associated with a second component, such as seal cap 108, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In this illustrative example, number of projections 120 may be associated with outer surface 121 of seal cap 108. In particular, number of projections 120 may extend from outer surface 121 of seal cap 108.

Number of projections 120 may be used to fair excess material 114. Fairing excess material 114 may include smoothing out excess material 114, pressing down on excess material 114, rounding out excess material 114, and/or rubbing down excess material 114. Number of projections 120 may be used to fair excess material 114 such that excess material 114 has a desired thickness around interface 118 and such that a gradual slope is created between excess material 114 and surface 122 of object 102. Further, excess material 114 may be faired to eliminate any voids, gaps, open spaces, debris, and/or other undesired inconsistencies that may be present within excess material 114.

In this illustrative example, number of projections 120 may be moved along interface 118 to fair excess material 114. In particular, seal cap 108 may be moved to move number of projections 120. For example, without limitation, seal cap 108 may be rotated about center axis 124 through seal cap 108. Rotation of seal cap 108 may, in turn, cause rotation of number of projections 120 about center axis 124.

Number of projections 120 may be configured such that excess material 114 is of a specified amount and/or a specified thickness, within selected tolerances after the fair operation has been performed. In some cases, one rotation, or turn, of seal cap 108 may be sufficient to achieve the desired amount and/or desired thickness for excess material 114.

Each of number of projections 120 may have a shape configured such that rotation of seal cap 108 and number of projections 120 allows fairing of excess material 114. Projection 123 may be an example of one of number of projections 120. Projection 123 may have shape 125. Shape 125 may be, for example, without limitation, a cross-sectional shape of projection 123. In one illustrative example, this cross-sectional shape may take the form of a curved shape configured to smooth out or round out excess material 114. Further, depending on shape 125, either rotating seal cap 108 in clockwise direction 126 or counter-clockwise direction 127 may allow fairing of excess material 114.

In one illustrative example, each of number of projections 120 may extend from seal cap 108 at a same vertical position with respect to center axis 124. However, in other illustrative examples, the position with respect to center axis 124 from which each of number of projections 120 may extend from seal cap 108 may be varied to ensure structural rigidity based on the type and/or location of fastener element 110 over which seal cap 108 is to be installed.

Further, in one illustrative example, the distance out to which each of number of projections 120 may extend away from center axis 124 may be the same. However, in other illustrative examples, this distance may be different for some of number of projections 120. For example, without limitation, at least one of number of projections 120 may extend away from center axis 124 to a distance relative to center axis 124 that is different from another projection in number of projections 120. In other words, two or more of number of projections 120 may have different outer radii relative to center axis 124.

In some illustrative examples, seal cap 108 may be rotated using tool 128. Tool 128 may be configured to be operated by human operator 130, robotic operator 132, or some other type of operator, depending on the implementation. For example, without limitation, human operator 130 may be able to rotate seal cap 108 using tool 128 once seal cap 108 has been adhered to fastener element 110.

In other illustrative examples, human operator 130 may use tool 128 to both press down on and rotate seal cap 108 simultaneously. In this manner, seal cap 108 may be adhered to fastener element 110 and excess material 114 may be faired concurrently. Number of projections 120 may allow better control when smoothing out excess material 114 as compared to smoothing out excess material 114 by hand, using a flat-edged tool, or some other type of tool.

In one illustrative example, tool 128 may be operated by robotic operator 132. For example, without limitation, tool 128 may take the form of end effector device 134 configured for use with robotic operator 132. Robotic operator 132 may take the form of, for example, without limitation, a robotic arm.

In this illustrative example, number of projections 120 may be comprised of any number of materials. Depending on the implementation, each of number of projections 120 may be comprised of at least one of a silicone material, a rubber material, a polymer, nylon, plastic, or some other type of material. The one or more materials out of which number of projections 120 may be formed may be selected for the purposes of smoothing out excess material 114.

In some cases, number of projections 120 may be removably attached to seal cap 108. In other words, number of projections 120 may be disposable.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
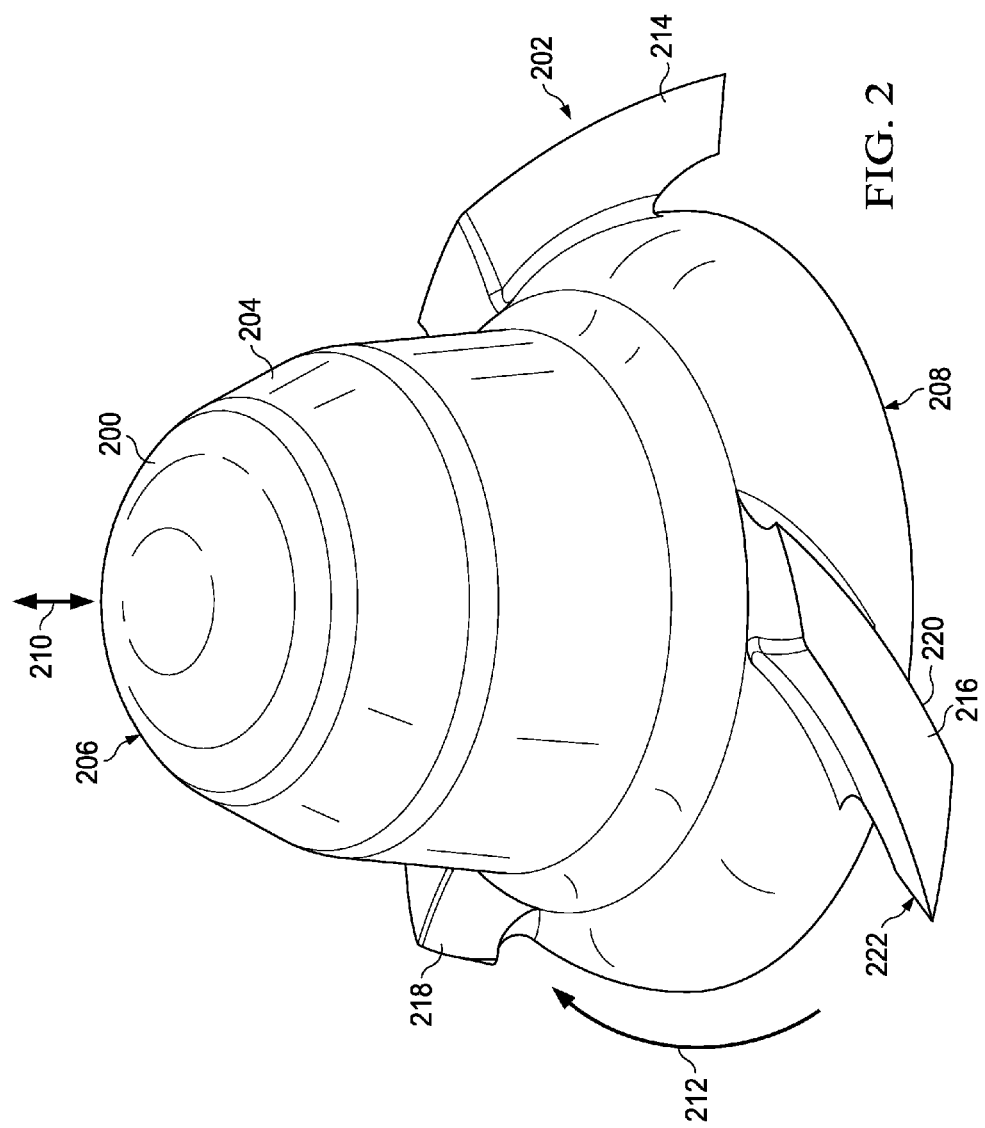
FIG. 2 is an illustration of a top isometric view of a seal cap in accordance with an illustrative embodiment.

With reference now to FIG. 2, an illustration of a top isometric view of a seal cap is depicted in accordance with an illustrative embodiment. In this illustrative example, seal cap 200 may be an example of one implementation for seal cap 108 in FIG. 1. In this illustrative example, number of projections 202 may be associated with seal cap 200. Number of projections 202 may be an example of one implementation for number of projections 120 in FIG. 1.

Seal cap 200 may have outer surface 204, first end 206, and second end 208. Number of projections 202 may extend from outer surface 204 of seal cap 200 at second end 208. Outer surface 204 may be an example of one implementation for outer surface 121 in FIG. 1.

In this illustrative example, seal cap 200 may be rotated about axis 210 in the direction of arrow 212. This rotation of seal cap 200 may, in turn, cause rotation of number of projections 202. Rotation of number of projections 202 in the direction of arrow 212 may be used to fair excess sealant material.

As depicted, number of projections 202 may include projection 214, projection 216, and projection 218. Each of number of projections 202 may have a shape selected specifically for performing fairing operations. For example, projection 216 may have shape 222. Shape 222 may be an example of one implementation for shape 125 in FIG. 1.

Further, projection 216 may also have surface 220. Surface 220 may be configured to contact excess sealant material and to smooth excess sealant material. In particular, surface 220 may have a texture configured to smooth out any portion of the excess sealant material in contact with surface 220 as number of projections 202 is moved along an interface (not shown) between seal cap 200 and an object (not shown). For example, without limitation, surface 220 may be a smooth surface.

In this manner, each of number of projections 202 may have a shape configured to allow a desired manipulation of excess sealant material. This manipulation of the excess sealant material may include capturing the excess sealant material, reshaping the excess sealant material, sweeping the excess sealant material, and/or reworking the excess sealant material in some other manner. Further, the position with respect to axis 210 from which each of number of projections 202 may extend from seal cap 200 may be varied to ensure structural rigidity based on the type and/or location of the fastener over which seal cap 200 is to be installed.

Figure 3:
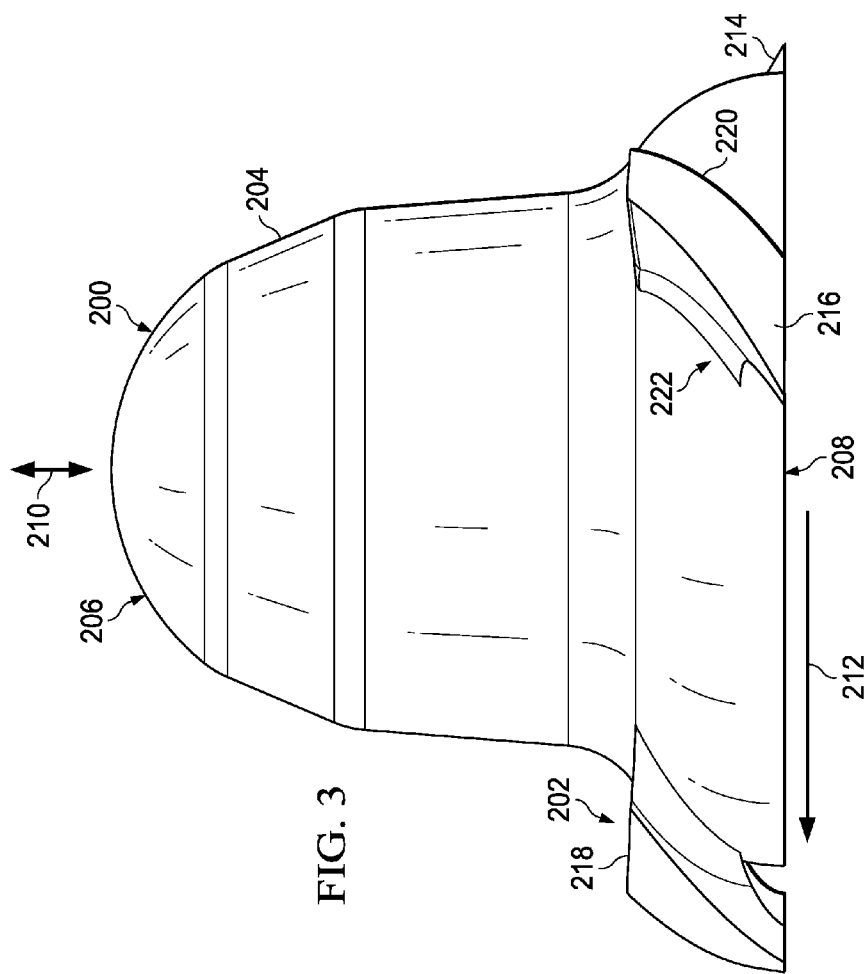
FIG. 3 is an illustration of a side view of a seal cap in accordance with an illustrative embodiment.
Figure 4:
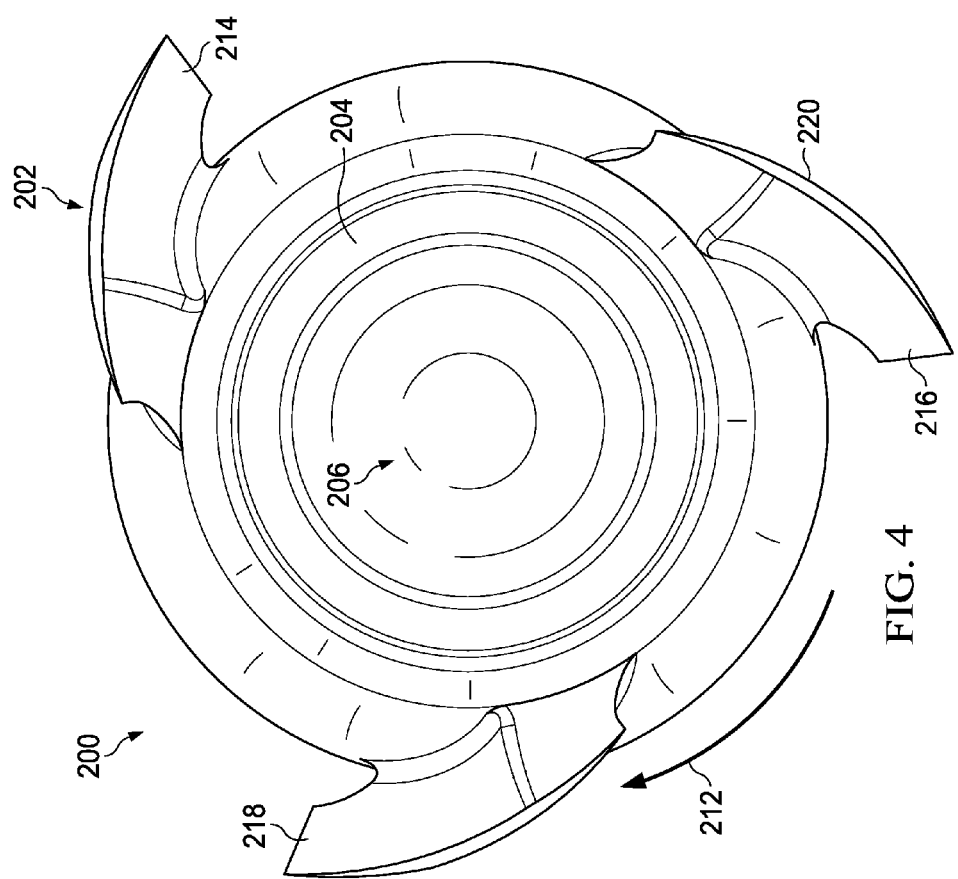
FIG. 4 is an illustration of a top view of a seal cap in accordance with an illustrative embodiment.

Turning now to FIG. 3, an illustration of a side view of seal cap 200 from FIG. 2 is depicted in accordance with an illustrative embodiment. As depicted, number of projections 202 may not extend past seal cap 200. With reference now to FIG. 4, an illustration of a top view of seal cap 200 from FIGS. 2-3 is depicted in accordance with an illustrative embodiment.

Figure 5:
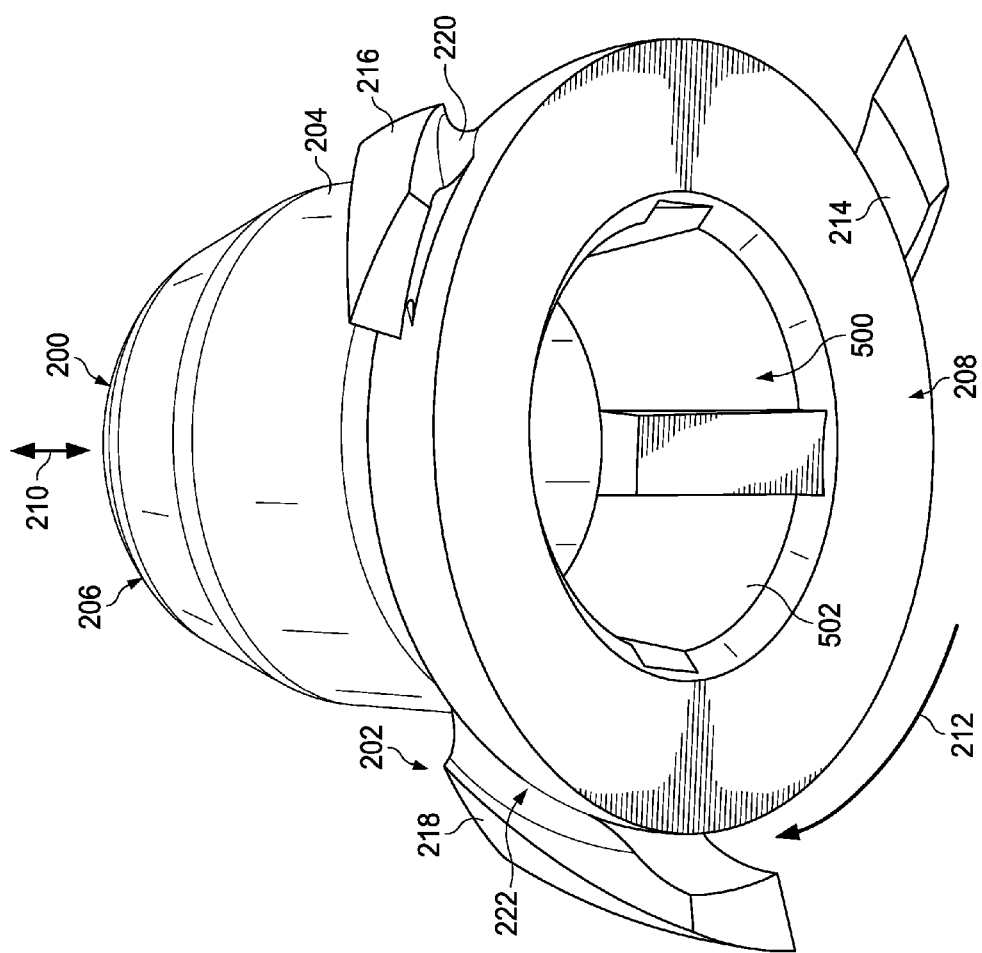
FIG. 5 is an illustration of a bottom isometric view of a seal cap in accordance with an illustrative embodiment.

Turning now to FIG. 5, an illustration of a bottom isometric view of seal cap 200 from FIGS. 2-4 is depicted in accordance with an illustrative embodiment. As depicted, seal cap 200 may have hollow portion 500. Hollow portion 500 may be an example of one implementation for hollow portion 111 in FIG. 1.

In this illustrative example, hollow portion 500 may be formed by inner surface 502 of seal cap 200. Inner surface 502 may be an example of one implementation for inner surface 116 in FIG. 1. Hollow portion 500 may be configured to receive sealant material and a fastener element (not shown). In some cases, hollow portion 500 may be specifically configured to receive the outer shape of this fastener element.

Figure 6:
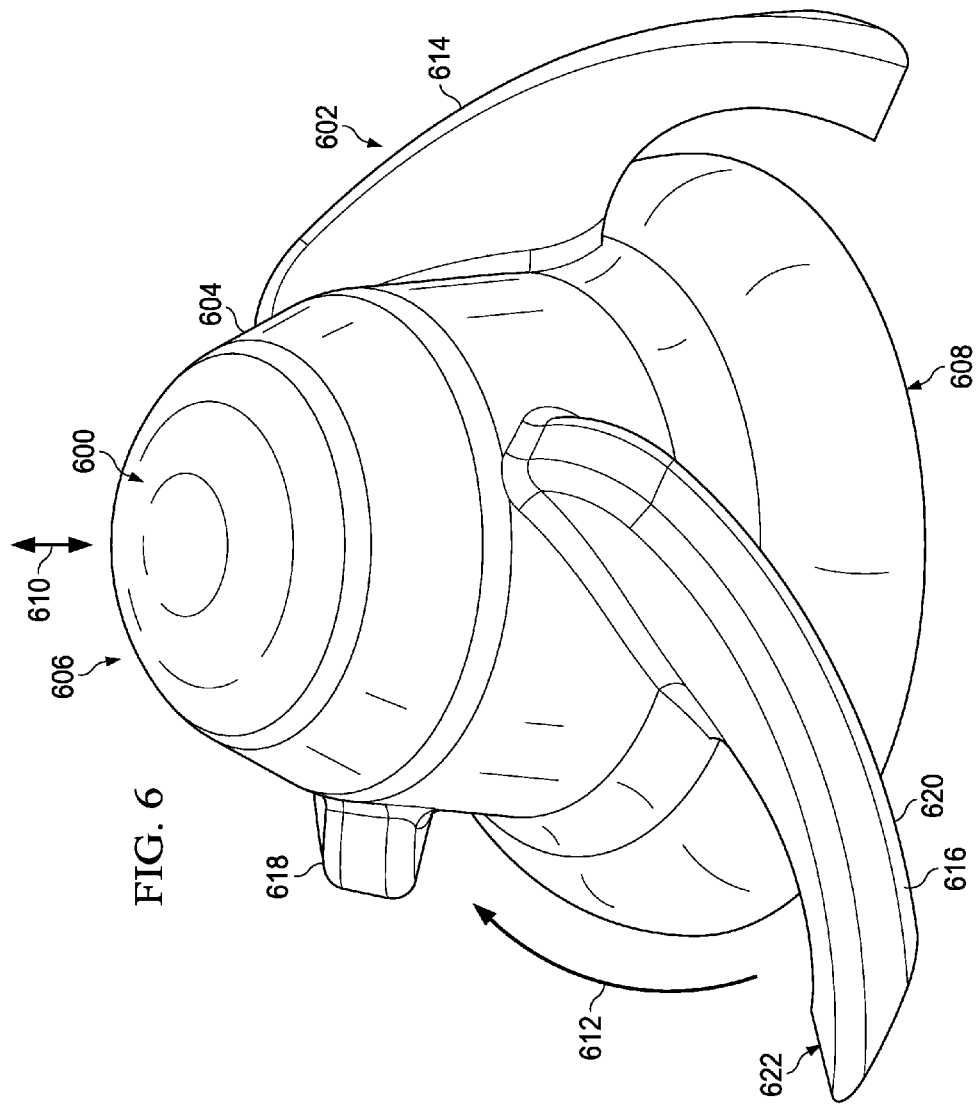
FIG. 6 is an illustration of a top isometric view of a different seal cap in accordance with an illustrative embodiment.

With reference now to FIG. 6, an illustration of a top isometric view of a different seal cap is depicted in accordance with an illustrative embodiment. In this illustrative example, seal cap 600 may be an example of one implementation for seal cap 108 in FIG. 1. In this illustrative example, number of projections 602 may be associated with seal cap 600. Number of projections 602 may be an example of one implementation for number of projections 120 in FIG. 1.

Seal cap 600 may have outer surface 604, first end 606, and second end 608. Number of projections 602 may extend from outer surface 604 of seal cap 600 at second end 608. Outer surface 604 may be an example of one implementation for outer surface 121 in FIG. 1.

In this illustrative example, seal cap 600 may be rotated about axis 610 in the direction of arrow 612. This rotation of seal cap 600 may, in turn, cause rotation of number of projections 602. Rotation of number of projections 602 in the direction of arrow 612 may be used to fair excess sealant material.

As depicted, number of projections 602 may include projection 614, projection 616, and projection 618. Each of number of projections 602 may have a shape selected specifically for performing fairing operations. For example, projection 616 may have shape 622. Shape 622 may be an example of one implementation for shape 125 in FIG. 1. Shape 622 may be different from shape 222 in FIG. 1.

Further, projection 616 may also have surface 620. Surface 620 may be configured to contact excess sealant material and to smooth excess sealant material. For example, without limitation, surface 620 may be a smooth surface.

Additionally, number of projections 602 may extend from seal cap 600, with respect to axis 610, higher than number of projections 202 extending from seal cap 200 in FIG. 2. The higher placement of each of number of projections 602 may allow seal cap 600 to accommodate fastener elements that may extend further from surfaces. Further, the higher placement of number of projections 602 may provide additional stability when rotating number of projections 602 to remove excess sealant material.

Figure 7:
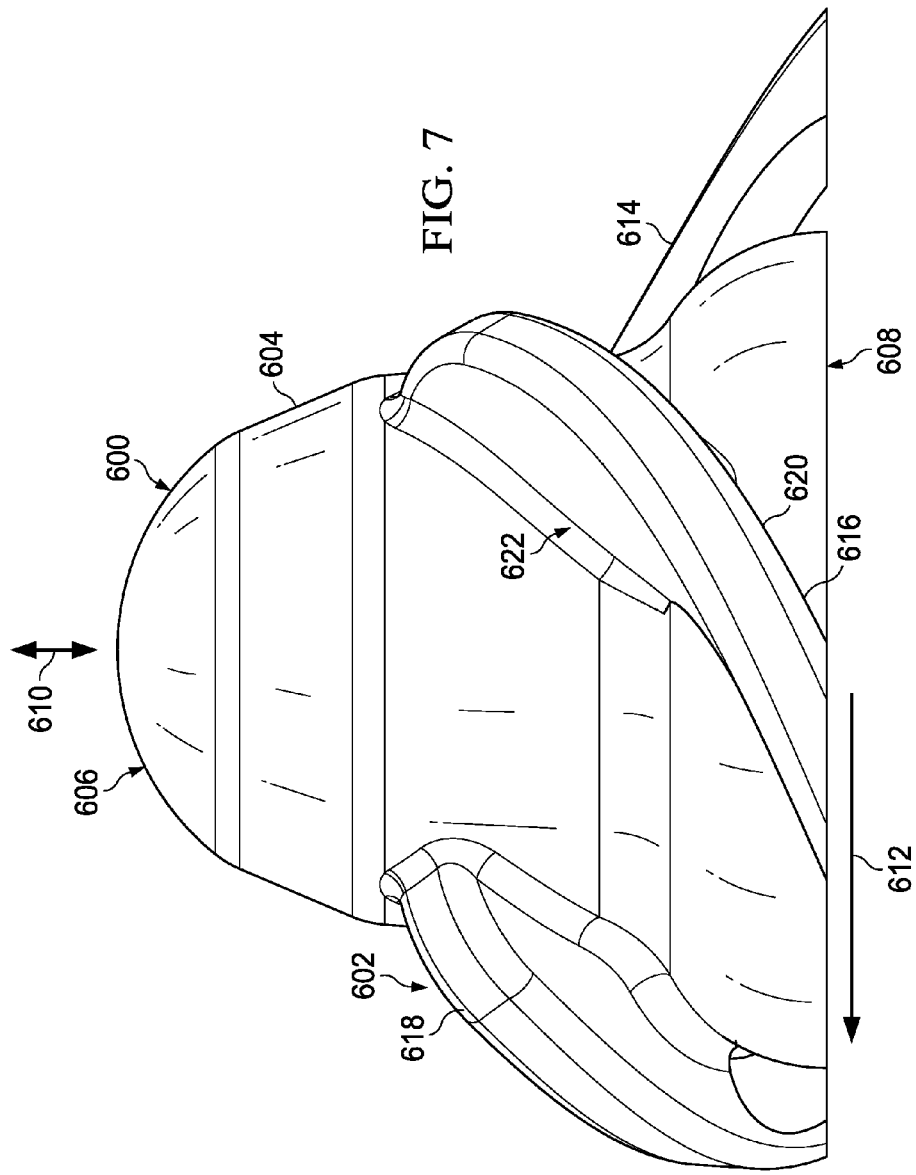
FIG. 7 is an illustration of a side view of the different seal cap in accordance with an illustrative embodiment.

Turning now to FIG. 7, an illustration of a side view of seal cap 600 from FIG. 6 is depicted in accordance with an illustrative embodiment. As depicted, number of projections 602 may not extend past seal cap 600.

Figure 8:
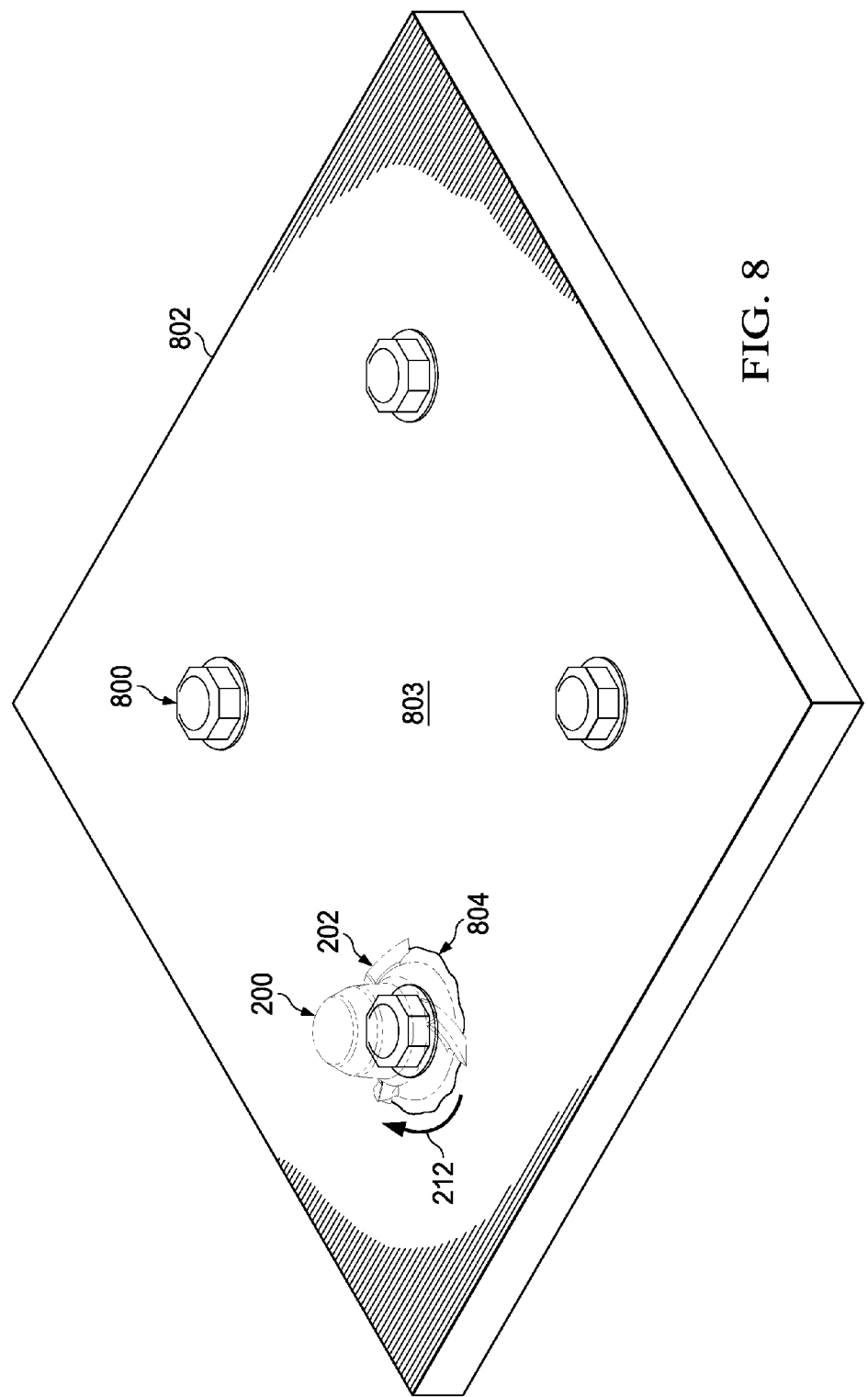
FIG. 8 is an illustration of a seal cap being installed over a fastener element in accordance with an illustrative embodiment.

With reference now to FIG. 8, an illustration of seal cap 200 from FIGS. 2-5 being installed over a fastener element is depicted in accordance with an illustrative embodiment. In this illustrative example, number of fastener elements 800 may be installed in object 802. Number of fastener elements 800 may be an example of one implementation for number of fastener elements 104 in FIG. 1. Object 802 may be an example of one implementation for object 102 in FIG. 1.

As depicted, number of fastener elements 800 may be exposed at surface 803 of object 802. Seal cap 200 may be used to cover and seal one of number of fastener elements 800 (shown in phantom).

Hollow portion 500 of seal cap 200 seen in FIG. 5 may be filled with sealant material and then seal cap 200 may be pressed down over the fastener element (shown in phantom) and adhered to the fastener element. As depicted, excess sealant material 804 may squeeze out around seal cap 200. Excess sealant material 804 may be an example of one implementation for excess material 114 in FIG. 1.

The amount and/or shape of excess sealant material 804 that squeezes out around seal cap 200 may be a factor in determining whether the seal between seal cap 200, object 802, and the fastener element (shown in phantom) underneath seal cap 200 meets selected requirements. These selected requirements may be, for example, engineering requirements, assembly requirements, and/or other types of requirements.

For example, without limitation, meeting these requirements may require that excess sealant material 804 squeezes out around the entire perimeter of seal cap 200. In some cases, meeting these requirements may require that excess sealant material 804 have a desired thickness and/or extend a desired distance past seal cap 200.

Number of projections 202 may be used to fair excess sealant material 804 such that excess sealant material 804 has the desired thickness. Further, number of projections 202 may be used to fair excess sealant material 804 to eliminate the presence of any voids within excess sealant material 804. Still further, number of projections 202 may be used to fair excess sealant material 804 to create a gradual slope between excess sealant material 804 and surface 803 of object 802.

For example, without limitation, seal cap 200 may be rotated in the direction of arrow 212 to rotate number of projections 202. When number of projections 202 is rotated, number of projections 202 may smooth out excess sealant material 804 to the desired thickness for excess sealant material.

The illustrations of seal cap 200 in FIGS. 2-5 and in FIG. 8 as well as seal cap 600 in FIGS. 6-7 are not meant to imply physical or architectural limitations to the manner in which an illustrative embodiment may be implemented. Other components in addition to or in place of the ones illustrated may be used. Some components may be optional.

As one illustrative example, although seal cap 200 in FIG. 2 is shown having three projections, a seal cap may have any number of projections. A seal cap may have, for example, without limitation, two, four, five, or some other number of projections.

The different components shown in FIGS. 2-8 may be illustrative examples of how components shown in block form in FIG. 1 can be implemented as physical structures. Additionally, some of the components in FIGS. 2-8 may be combined with components in FIG. 1, used with components in FIG. 1, or a combination of the two.

Figure 9:
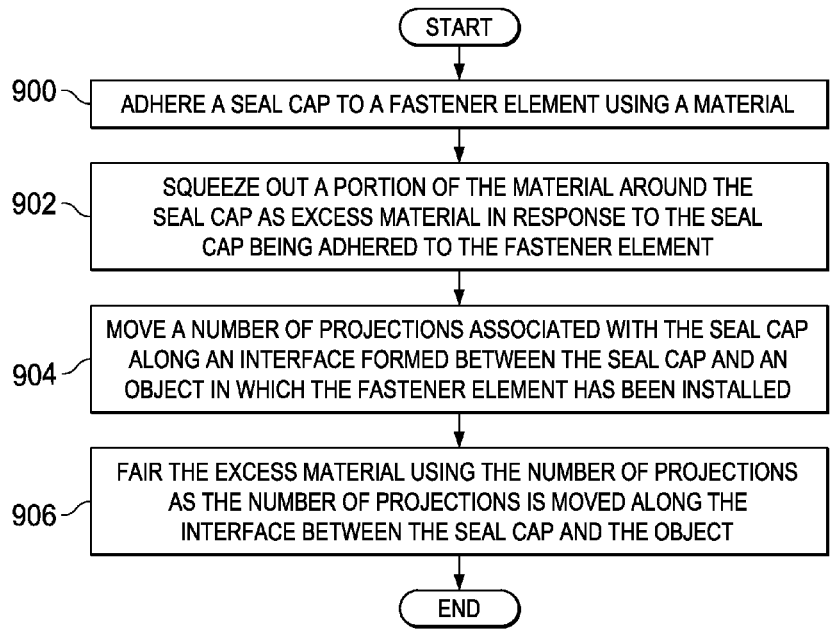
FIG. 9 is an illustration of a process for installing a seal cap in the form of a flowchart in accordance with an illustrative embodiment.

With reference now to FIG. 9, an illustration of a process for installing a seal cap is depicted in the form of a flowchart in accordance with an illustrative embodiment. The process illustrated in FIG. 9 may be implemented to install, for example, without limitation, seal cap 108 over fastener element 110 in FIG. 1.

The process may begin by adhering seal cap 108 to fastener element 110 using material 112 (operation 900). A portion of material 112 may be squeezed out around seal cap 108 as excess material 114 in response to seal cap 108 being adhered to fastener element 110 (operation 902).

Thereafter, number of projections 120 associated with seal cap 108 may be moved along interface 118 formed between seal cap 108 and object 102 in which fastener element 110 has been installed (operation 904). Excess material 114 may be faired using number of projections 120 as number of projections 120 is moved along interface 118 between seal cap 108 and object 102 (operation 906), with the process terminating thereafter. Operation 906 may be performed such that excess material 114 is faired to a desired thickness and such that a gradual slope is created between excess material 114 and surface 122 of object 102.

Figure 10:
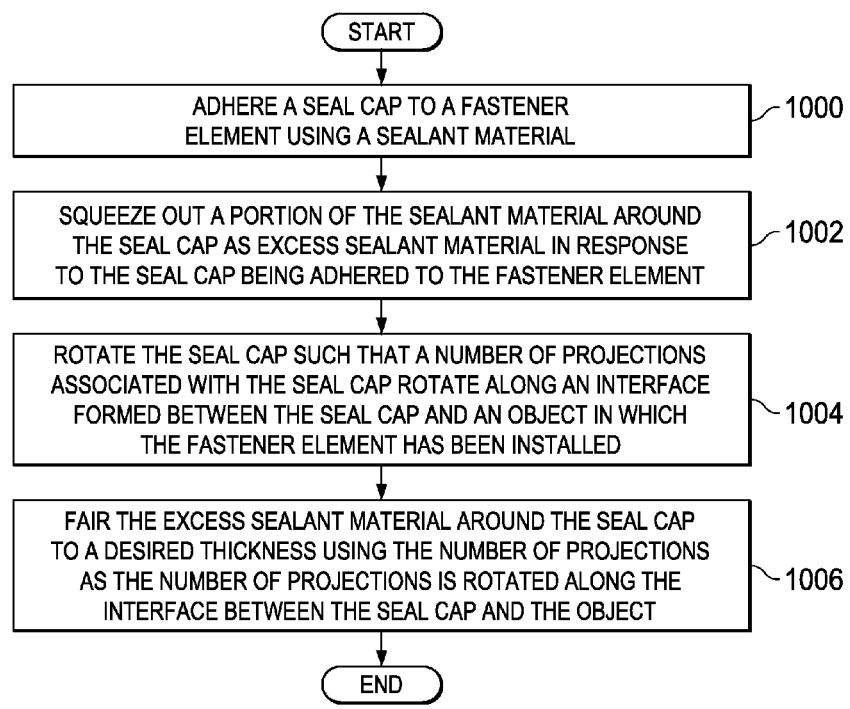
FIG. 10 is an illustration of a process for installing a seal cap in the form of a flowchart in accordance with an illustrative embodiment.

With reference now to FIG. 10, an illustration of a process for sealing a fastener element is depicted in the form of a flowchart in accordance with an illustrative embodiment. The process illustrated in FIG. 14 may be implemented to seal fastener element 110 using seal cap 108 in FIG. 1.

The process may begin by adhering seal cap 108 to fastener element 110 using sealant material 113 (operation 1000). A portion of sealant material 113 may squeeze out around seal cap 108 as excess sealant material in response to seal cap 108 being adhered to fastener element 110 (operation 1002).

Thereafter, seal cap 108 may be rotated such that number of projections 120 associated with seal cap rotate along interface 118 formed between seal cap 108 and object 102 in which fastener element 110 has been installed (operation 1004). The excess sealant material around seal cap 108 may be faired to a desired thickness using number of projections 120 as number of projections 120 is rotated along interface 118 between seal cap 108 and object 102 (operation 1006), with the process terminating thereafter. Operation 1006 may be performed such that a gradual slope is created between the excess sealant material and surface 122 of object 102 and such that any voids within the excess sealant material are eliminated.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method in the form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in the form of a block diagram is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In particular, number of projections 120 associated with seal cap 108 from FIG. 1 may be used for fairing excess sealant material around seal caps during any one of the stages of aircraft manufacturing and service method 1100. For example, without limitation, seal caps similar to seal cap 108 may be used to seal fastener elements during at least one of component and subassembly manufacturing 1106, system integration 1108, routine maintenance and service 1114, or some other stage of aircraft manufacturing and service method 1100. Further, seal caps similar to seal cap 108 may be used to seal fastener elements that have been installed in any number of structures within airframe 1202, propulsion system 1208, hydraulic system 1212, environmental system 1214, and/or other systems within aircraft 1200.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a seal cap configured to be adhered to and sealed to a fastener element; and
a plurality of projections attached to and extending radially outward from an outer surface of the seal cap in which the plurality of projections is configured to fair excess material around the seal cap when the plurality of projections is moved along an interface formed between the seal cap and an object in which the fastener element has been installed, wherein each of the plurality of projections comprises a surface configured to contact the excess material as the plurality of projections is moved along the interface between the seal cap and the object, wherein the surface has a curved shape defining a channel between each of the plurality of projections and the outer surface of the seal cap, wherein the curved shape is configured to ensure that the excess material is faired to have a desired thickness.

2. The apparatus of claim 1, wherein the plurality of projections is moved along the interface by rotating the seal cap such that the plurality of projections is rotated along the interface between the seal cap and the object.

3. The apparatus of claim 2, wherein the seal cap is configured to be rotated using a tool configured to be operated by one of a human operator and a robotic operator.

4. The apparatus of claim 1, wherein the seal cap is adhered to the fastener element using a material and wherein the excess material is a portion of the material that squeezes out around the seal cap when the seal cap is adhered to the fastener element.

5. The apparatus of claim 4, wherein the material is selected from one of a sealant material and an adhesive material.

6. The apparatus of claim 1, wherein each of the plurality of projections has a shape selected such that the excess material is smoothed out when the plurality of projections is moved along the interface between the seal cap and the object.

7. The apparatus of claim 6, wherein the shape is a cross-sectional shape that is a curved shape.

8. The apparatus of claim 1, further comprising:
a first projection of the plurality of projections extending away from a center axis through the seal cap to a first distance relative to the center axis; and
a second projection of the plurality of projections extending away from the center axis through the seal cap to a second distance relative to the center axis, wherein the first distance and the second distance are different.

9. The apparatus of claim 1, wherein the surface has a texture configured to smooth out any portion of the excess material in contact with the surface as the plurality of projections is moved along the interface between the seal cap and the object.

10. The apparatus of claim 1, wherein the curved shape is configured to create a gradual slope of excess material between the object in which the fastener element has been installed and the outer surface of the seal cap when the plurality of projections is moved along the interface formed between the seal cap and the object in which the fastener element has been installed.

11. A unitary seal cap comprising:
an inner surface defining a hollow portion within the seal cap configured to receive a fastener element, the inner surface configured to be adhered to and sealed to the fastener element using a sealant material in which at least a portion of the sealant material squeezes out and around the seal cap as excess sealant material;
an outer surface defining an exterior surface of the seal cap; and
a plurality of curved projections attached to and extending from the outer surface of the seal cap in which the plurality of curved projections is configured to fair the excess sealant material around the seal cap when the plurality of curved projections is moved along an interface formed between the seal cap and an object in which the fastener element has been installed, wherein each of the plurality of curved projections comprises:
a surface configured to contact the excess material as the plurality of projections is moved along the interface between the seal cap and the object, wherein the surface comprises:
a texture configured to smooth out any portion of the excess material in contact with the surface as the plurality of projections is moved along the interface between the seal cap and the object; and
a curved shape defining a channel between each of the plurality of projections and the outer surface of the seal cap, wherein the curved shape is configured to ensure that the excess material is faired to have a desired thickness.

12. The unitary seal cap of claim 11, wherein the curved shape is configured to create a gradual slope of excess material between the object in which the fastener element has been installed and the outer surface of the seal cap when the plurality of projections is moved along the interface formed between the seal cap and the object in which the fastener element has been installed.

* * * * *